Nov. 6, 1923.
W. H. FOX
1,473,403
METHOD AND APPARATUS FOR MAKING CATHETERS
Filed Dec. 9, 1922
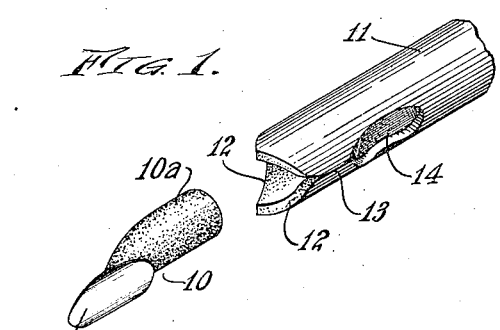
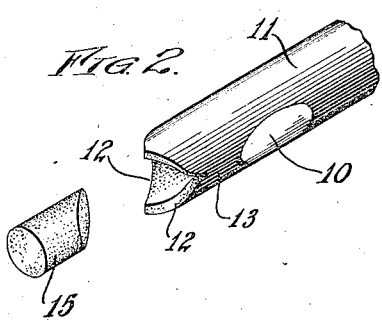
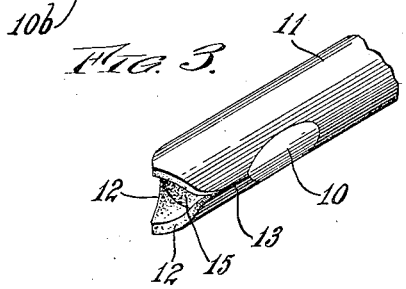
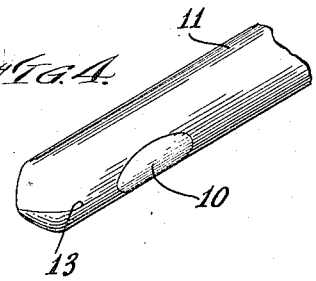
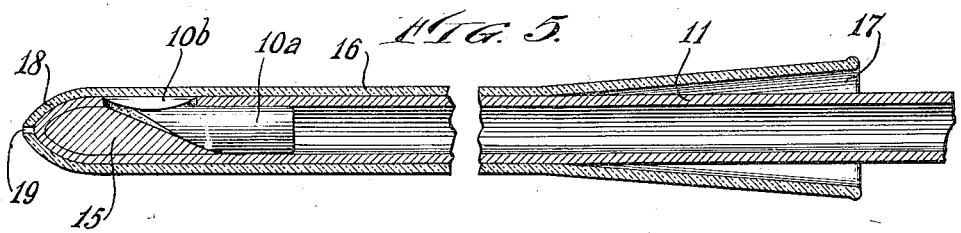
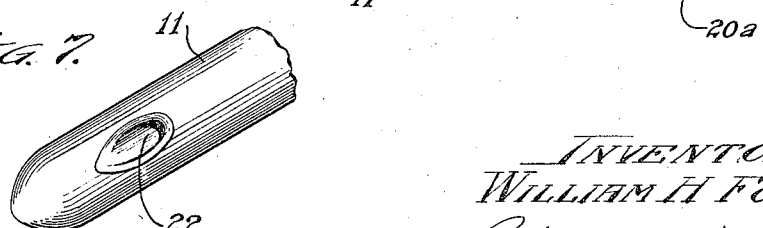
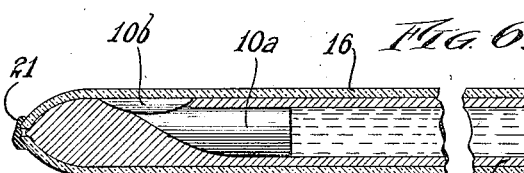
INVENTOR,
WILLIAM H FOX
BY Robert W Pierson
Atty.

Patented Nov. 6, 1923.

1,473,403

UNITED STATES PATENT OFFICE.

WILLIAM H. FOX, OF AKRON, OHIO, ASSIGNOR TO THE B. F. GOODRICH COMPANY, OF NEW YORK, N. Y., A CORPORATION OF NEW YORK.

METHOD AND APPARATUS FOR MAKING CATHETERS.

Application filed December 9, 1922. Serial No. 605,812.

*To all whom it may concern:*

Be it known that I, WILLIAM H. FOX, a citizen of the United States, residing at Akron, in the county of Summit and State of Ohio, have invented a certain new and useful Method and Apparatus for Making Catheters, of which the following is a specification.

This invention relates to the manufacture of catheters and particularly to methods and apparatus for forming and vulcanizing rubber catheters.

It has heretofore been common practice in the manufacture of catheters to mold the catheter, during vulcanization, with a shallow depression near its closed end, where the eye is to be, and then, after vulcanization, to drill through the wall of the catheter at said depression, to form the eye. The drilling of the eye is a manual operation requiring great care and skill, in spite of which defective articles are frequently produced.

The chief object of my invention is to reduce the production cost of catheters by eliminating certain operations in the manufacture thereof and to avoid waste such as heretofore has resulted from imperfect drilling operations.

Of the accompanying drawings:

Fig. 1 is a perspective view of one end portion of an unvulcanized rubber catheter tube prepared to receive a metallic eye-forming core, also shown.

Fig. 2 is a similar view of the tube with the core in place, ready to receive a filler plug, also shown.

Fig. 3 is a similar view of the tube, core, and the filler plug in place.

Fig. 4 is a similar view showing the end of the tube sealed around the filler plug.

Fig. 5 is a longitudinal section of the prepared tube and a glass tube in which it is vulcanized.

Fig. 6 is a view similar to Fig. 5, showing the glass tube and the catheter therein after vulcanization of the latter.

Fig. 7 is a perspective view of the end portion of a finished catheter, showing the eye therein.

Referring to the drawings, 10 is a metallic core comprising a short cylindrical portion 10$^a$ from which the core is tapered and curved in the form of an elbow, the latter terminating in an elliptical plate 10$^b$, the outer face of said plate being cylindrically curved, concentrically with relation to, but on greater radius than, said portion, 10$^a$, and having its long axis parallel thereto.

The unvulcanized rubber tube, 11, of which the catheter is to be made, is notched on one end as shown at 12, 12 and is slit as shown at 13 from the apex of one of said notches to an elliptical aperture 14 cut in the tube near its end, said slit being in alignment with the long axis of said aperture. A coating of rubber cement is applied to the end edges of the tube 11 and to the interior of the tube as far back as the farther end of the aperture 14.

After the tube is thus prepared, the body portion and elbow of the core 10, are coated with cement, as by dipping, and said core is inserted in the tube 11 so that its face plate 10$^b$ lies within the aperture 14, and its body portion 10$^a$ extends away from the notched end of the tube, said core being of appropriate size and said plate being of such thickness as to lie flush with the surface of said tube. The insertion of the core may be facilitated by opening the tube at the slit 13. Next a cylindrical, unvulcanized rubber, filler plug 15, beveled at one end and entirely covered with cement, is inserted into the end of the tube, its beveled face abutting the elbow of the core 10. The end of the tube is then closed over said plug by folding and sticking together the cemented projections of material defined by the notches, 12, 12, as clearly shown in Fig. 4.

After a lapse of time sufficient for the cement to dry, the catheter is ready to be vulcanized, and is forced into a glass vulcanizing tube, 16, said tube being generally cylindrical in shape, having as here shown, a flared end portion 17 and having its other end tapered as at 18 to receive and mold the closed end of the catheter, the glass tube 16 being formed with a small aperture or vent 19 at its end to permit the escape of air as the catheter is forced into the tube. The catheter is then filled with a heat-expandible substance, preferably fluid under pressure, its open end portion is folded over the rear end of the glass tube, covered with a reinforcing bandage 20, and held as by a winding of twine 20$^a$, and the aperture 19 is sealed with stiff rubber cement as shown at 21 to keep out moisture. The glass tube 16, with the catheter therein as described, is then subjected to vulcanizing heat, whereby the catheter is vulcanized under internal pressure resulting from the heat-expandible substance therein, escape of said substance being prevented by the cementing of the parts as above described, and the heat and internal pressure causing the several rubber parts to coalesce and to be molded against the glass tube 16 and the core 10, as shown in Fig. 6.

After the catheter is vulcanized, it is removed from the glass tube and the core 10 is extracted therefrom through the aperture formed by the plate 10$^b$. The end portion of the finished article is shown in Fig. 7, where said aperture is shown at 22.

Modifications may be resorted to without departing from the scope of my invention and I do not wholly limit my claims to the exact procedure, nor to the specific form of apparatus, herein described.

I claim:

1. The method of making catheters of plastic material which comprises forming the stock into a structure approximating the form of the finished catheter, with an aperture through the wall of the structure at the position of the eye, and molding said structure, including the walls of said aperture, into final form.

2. The method of making catheters of a vulcanizable, plastic material which comprises forming the stock into a structure approximating the form of the finished catheter, with an aperture through the wall of the structure at the position of the eye, and molding said structure to final form and vulcanizing it under internal fluid pressure.

3. The method of making catheters of vulcanizable, plastic material which comprises forming a tube of said material, forming an aperture in the wall of said tube near one end thereof, inserting a core in said aperture, plugging and closing the end of said tube, adjacent said core, with a body of said material, molding and vulcanizing the resulting structure with the core therein, and thereafter withdrawing said core.

4. The method of making rubber catheters which comprises forming an aperture through the wall of an unvulcanized rubber tube near an end thereof, in position to constitute the eye of the catheter, slitting the tube from said aperture to the end of the tube, opening the tube at said slit and mounting a core in said aperture, closing the end of the tube adjacent said core, and molding and vulcanizing said tube with said core therein.

5. The method of making catheters of vulcanizable, plastic material which comprises building and assembling the catheter with a rigid core incorporated therein and extending through its wall, vulcanizing said catheter, and then removing said core from the catheter.

6. The method of making catheters which comprises building said catheter with a metal core extending from its outer surface into its interior, vulcanizing said catheter under internal fluid pressure, and then removing said core from the catheter.

7. The method of making catheters which comprises perforating an unvulcanized rubber tube near its end, cementing a metallic core into said perforation and the adjacent portion of the tube, sealing the end of said tube, vulcanizing the tube, and then removing said core therefrom.

8. Apparatus for making catheters, said apparatus comprising a core adapted to extend through the wall of the catheter, and a mold adapted to restrain said core against pressure from within the catheter.

9. Apparatus for making catheters, said apparatus comprising a core having a portion adapted to fit within the catheter and a portion adapted to traverse a wall thereof, and a vulcanizing mold adapted to enclose the catheter with said core therein.

10. Apparatus for making catheters, said apparatus comprising an integral, rigid core having a body portion adapted to fit within said catheter while a portion thereof extends through the wall of the catheter and lies flush with the outer surface thereof, and a vulcanizing mold adapted to confine said catheter and core.

11. Apparatus for making catheters, said apparatus comprising a core adapted to extend through the wall of the catheter, and a mold for confining said catheter and core, said mold comprising an uninterrupted tubular body portion and a tapered end portion formed with an aperture at its extremity.

12. Apparatus for making catheters, said apparatus comprising a core adapted to extend through the wall of the catheter, a mold for confining said catheter and core, said mold comprising an uninterrupted tubular body portion and a tapered end portion formed with an aperture at its extremity, and means for closing said mold against internal pressure.

In witness whereof I have hereunto set my hand this 5 day of December, 1922.

WILLIAM H. FOX.